UNITED STATES PATENT OFFICE.

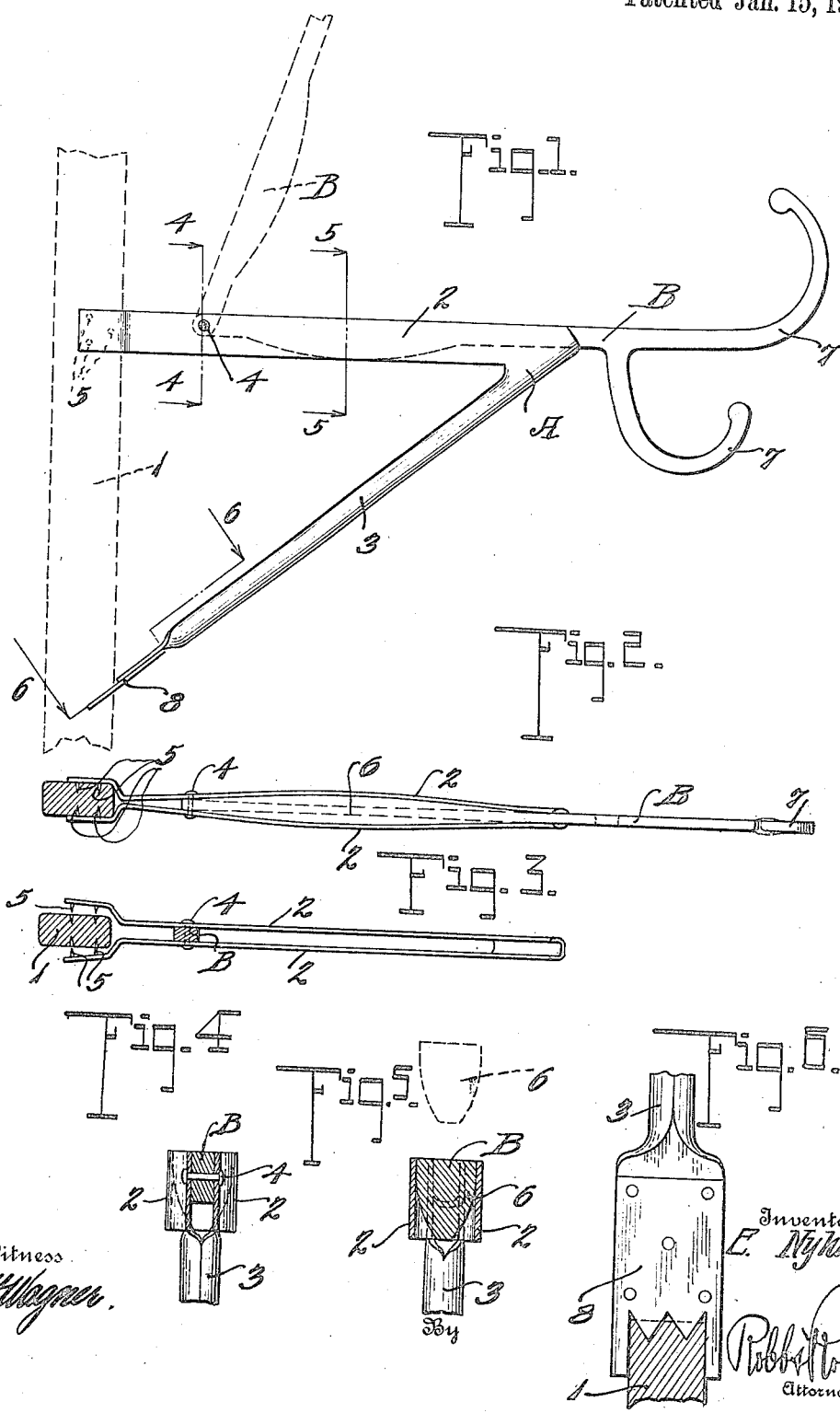

EDWARD NYHUS, OF IVANHOE, MINNESOTA.

HARNESS-HANGER.

1,253,870.

Specification of Letters Patent.

Patented Jan. 15, 1918.

Application filed May 29, 1917. Serial No. 171,705.

*To all whom it may concern:*

Be it known that I, EDWARD NYHUS, a citizen of the United States, residing at Ivanhoe, in the county of Lincoln and State of Minnesota, have invented certain new and useful Improvements in Harness-Hangers, of which the following is a specification.

This invention has to do with hanger devices or supports of a character that may be applied to or adjusted upon an object without the use of permanent or fixed fastening means, such as bolts or the like, but rather by virtue of operative gripping means embodied in the structure of the device itself.

More specifically, the invention may be styled a harness hanger, though I do not desire to be understood that its utility is confined to such function as is inferred from this term. As such, it comprises gripping means or jaw members which are operable to open and close upon an object to which the hanger is to be attached, under the action of a supporting arm, bracing means being preferably employed for sustaining the arm aforesaid in operative supporting position.

For a full understanding of the present invention, reference is to be had to the following description, and the accompanying drawing, in which:

Figure 1 is a side elevation of a device constructed in accordance with this invention, showing in dotted lines an upraised and releasing position of the harness supporting arm.

Fig. 2 is a top plan with the arm lowered and the bracket gripping the object of support.

Fig. 3 is a similar view to that of Fig. 2, showing the gripping means released, and the arm in section.

Figs. 4, 5 and 6 are sectional views on the lines 4—4, 5—5, and 6—6, respectively, of Fig. 1.

Referring to the drawing and specifically describing the invention, 1 designates a studding or other object to which this device is adapted to be attached according to the height desired by the user. The invention comprises essentially a bracket A and a movable supporting arm B, the former consisting of a horizontal portion formed by spaced, resilient straps or bars, and a brace designated 2 and 3, respectively. By reference to Figs. 2 and 3, it will be noted that the spaced bars 2 are connected intermediate their lengths by the connection 4 upon which connection the arm B is pivotally mounted for vertical movement. At one end the bars 2 each have inwardly projecting prongs 5, the extremities of said bars being bent outwardly slightly to form gripping jaws capable of opening and closing movements. The actuation of the jaws just referred to is produced by a spreading and closing of the bars 2 at the side of the connection opposite the jaws and to this end I form the arm or lever B with an enlarged portion 6, which is somewhat wedge-shaped in cross section. Thus when the arm is lowered said enlarged portion cams or wedges apart the spaced bars 2, causing the jaws thereof to close upon an object interposed therebetween and obviously lifting the arm will release the bars from the pressure and allow them to assume their normal position, opening the jaws as shown in Fig. 3.

By reason of the arrangement of the arm B in the manner above specified, when in horizontal position, it is sustained by the bracket and upon the arm and bracket harness or other articles may be hung. The arm is preferably provided with one or more suitable hooks 7, 7 and the arm may be operated by grasping the hooks as a handle.

To insure the positive engagement of the brace member 3 with the studding 1, there is provided a toothed blade 8 which by exerting of pressure or imparting of blows on the outer portion of the bracket will bite into the object quite readily.

It will be apparent that this device lends itself readily to attachment and detachment for removal or adjustment purposes as controlled by operation of the arm B, and may be used as a scaffold supporting bracket as well as a harness hanger.

Slight changes may readily be made in the details of construction of the several parts without departing from the spirit of the invention and within the scope of the claims hereto appended.

Having thus described my invention, what is claimed as new is:

1. In a device of the class described, a support having at one end object engaging means, and a member mounted on said support at a point intermediate its length and movable into and out of supportable relation with respect to the support, said member including means to actuate the object engaging means incident to such movements.

2. In a device of the class described, a support comprising spaced elements terminating in object gripping means, connecting means intermediate the lengths of said elements, and a pivoted arm coacting with said support and movable into position between the spaced elements at the side of the connecting means opposite the gripping means whereby to effect gripping action.

3. In a device of the class described, a supporting member comprising spaced yieldable elements terminating at one end in object engaging jaws, a lever, and a connection for said spaced elements intermediate their length and on which the lever aforesaid is mounted, said lever being movable into position between the spaced members to expand the same and thereby effect actuation of the jaws aforesaid.

4. In a device of the class described, a supporting member comprising spaced yieldable elements terminating at one end in object engaging jaws, a connection between said elements, and a lever mounted on said connection and having a camming portion movable into position between the spaced elements to effect gripping action of the jaws.

5. In a device of the class described, a horizontal support comprising spaced bars, a connection therefor midway of their length, said bars having jaw elements at one end thereof, and an arm having an enlarged portion intermediate its length movable into position between the spaced bars to effect gripping action of the jaw elements.

6. In a device of the class described, a horizontal support and a brace member, constituting a bracket, said horizontal portion having object gripping jaws, and an arm pivotally connected with the horizontal portion having a substantially wedge-shaped portion intermediate its length engageable with the horizontal portion to effect attachment of the bracket on an object of support.

In testimony whereof I affix my signature.

EDWARD NYHUS.

Copies of this patent may be obtained for five cents each, by addressing the "Commissioner of Patents, Washington, D. C."